US012728773B2

(12) United States Patent
Usui et al.

(10) Patent No.: US 12,728,773 B2
(45) Date of Patent: Sep. 8, 2026

(54) SEAT DEVICE FOR VEHICLE AND CONTROL METHOD THEREOF

(71) Applicant: Honda Motor Co., Ltd., Tokyo (JP)

(72) Inventors: Shogo Usui, Tokyo (JP); Koji Hashimoto, Tokyo (JP); Masakazu Okada, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 44 days.

(21) Appl. No.: 18/940,779

(22) Filed: Nov. 7, 2024

(65) Prior Publication Data

US 2025/0236217 A1 Jul. 24, 2025

(30) Foreign Application Priority Data

Jan. 24, 2024 (CN) ........................ 202410098037.6

(51) Int. Cl.
*B60N 2/02* (2006.01)
*B60N 2/12* (2006.01)
*B60Q 3/80* (2017.01)
*E05F 15/40* (2015.01)
*E05F 15/655* (2015.01)

(52) U.S. Cl.
CPC ....... *B60N 2/0278* (2023.08); *B60N 2/02246* (2023.08); *B60N 2/0277* (2023.08); *B60N 2/12* (2013.01); *B60Q 3/80* (2017.02); *E05F 15/40* (2015.01); *E05F 15/655* (2015.01); *E05Y 2400/30* (2013.01); *E05Y 2400/36* (2013.01); *E05Y 2400/564* (2013.01); *E05Y 2400/822* (2013.01); *E05Y 2900/531* (2013.01)

(58) Field of Classification Search
CPC ............... B60N 2/0278; B60N 2/0277; B60N 2/02246; B60N 2/12; E05F 15/40; E05F 15/655; B60Q 3/80; E05Y 2400/30; E05Y 2400/36; E05Y 2400/564; E05Y 2400/822; E05Y 2900/531
See application file for complete search history.

(56) References Cited

U.S. PATENT DOCUMENTS

2007/0216330 A1* 9/2007 Kawakura ............ H02H 7/0851 318/470
2023/0072849 A1* 3/2023 Imai ................... B60N 2/02246
2023/0219463 A1* 7/2023 Katayama .......... B60N 2/02246 701/49
2024/0175300 A1* 5/2024 Lee ......................... E05B 81/20

FOREIGN PATENT DOCUMENTS

JP 2018103792 7/2018

* cited by examiner

*Primary Examiner* — Steven Vu Nguyen
(74) *Attorney, Agent, or Firm* — JCIPRNET

(57) ABSTRACT

A seat device for a vehicle and a control method thereof are provided. The seat device for the vehicle includes: an electric device for moving a seat of the vehicle; a pinch detection unit that detects a pinched obstacle by detecting a load change of the electric device when the seat moves; and a control unit that causes the electric device to perform a reverse operation when the pinch detection unit detects that the obstacle is pinched, so as to cause the seat to reversely move. A reverse movement amount by which the seat is reversely moved is determined based on a time from when the load change starts to when the pinch detection unit detects that the obstacle is pinched.

12 Claims, 9 Drawing Sheets

SEAT DEVICE FOR VEHICLE AND CONTROL METHOD THEREOF

CROSS-REFERENCE TO RELATED APPLICATION

This application claims the priority benefit of Taiwan application serial no. 202410098037.6, filed on Jan. 24, 2024. The entirety of the above-mentioned patent application is hereby incorporated by reference herein and made a part of this specification.

BACKGROUND

Technical Field

The disclosure relates to a seat device for a vehicle and a control method thereof.

Description of Related Art

In recent years, efforts have been actively made to provide access to sustainable transportation systems that also take into account disadvantaged groups of traffic participants, such as the elderly, the disabled or children. In order to achieve the stated purpose, research and development efforts are made to further improve the safety and convenience of transportation through development related to the livability of vehicle.

Just like the power windows and sunroof of the vehicle may perform pinch detection, the seats also use motor pulse sensors to detect their position. When detecting the squeeze caused by the movement of a seat (that is, the front seat moves and pinches the rear seat occupant), since the surface of the seat is soft, there will be a deviation in the time point when the pinch is detected. However, since the reversal amount of the seat is fixed, the stop address of the seat may be different after the seat is reversed. Therefore, there may be a problem that the avoidance space may not be sufficiently secured.

However, in the livability of the vehicle, how to ensure the avoidance space when pinch occurs due to the automatic operation of the seat is an issue.

SUMMARY

The disclosure aims to ensure the avoidance space when pinch occurs due to automatic operation of the seat, which in turn, contributes to the development of sustainable transportation systems.

Based on the above description, according to an embodiment of the disclosure, a seat device for a vehicle is provided. The seat device for the vehicle includes: an electric device for moving a seat of the vehicle; a pinch detection unit that detects a pinched obstacle by detecting a load change of the electric device when the seat moves; and a control unit that causes the electric device to perform a reverse operation when the pinch detection unit detects that the obstacle is pinched, so as to cause the seat to reversely move. A reverse movement amount by which the seat is reversely moved is determined based on a time from when the load change starts to when the pinch detection unit detects that the obstacle is pinched.

Furthermore, according to another embodiment of the disclosure, a control method for a seat device for a vehicle is provided. The seat device has an electric device for moving a seat of the vehicle. The control method includes: detecting a pinched obstacle by detecting a load change of the electric device when the seat moves; and causing the electric device to perform a reverse operation when a pinch detection unit detects that the obstacle is pinched, so as to cause the seat to reversely move. A reverse movement amount by which the seat is reversely moved is determined based on a time from when the load change starts to when the pinch detection unit detects that the obstacle is pinched.

According to the embodiment of the disclosure, by making the reverse movement amount variable, the stopping position of the seat after the reverse operation does not change and may be kept fixed, thereby ensuring an avoidance space. Also, when a pinch is detected, the other seat (if the driver seat is detected, the other seat is the passenger seat) as well as the power sliding door and the second seat also operate at the same time, thereby further ensuring the surrounding avoidance space. Also, considering the night-time environment, when a pinch is detected, the interior lights in the vehicle may also be turned on to create an environment where it is easier to avoid obstacles.

DESCRIPTION OF THE EMBODIMENTS

Figure 1A:
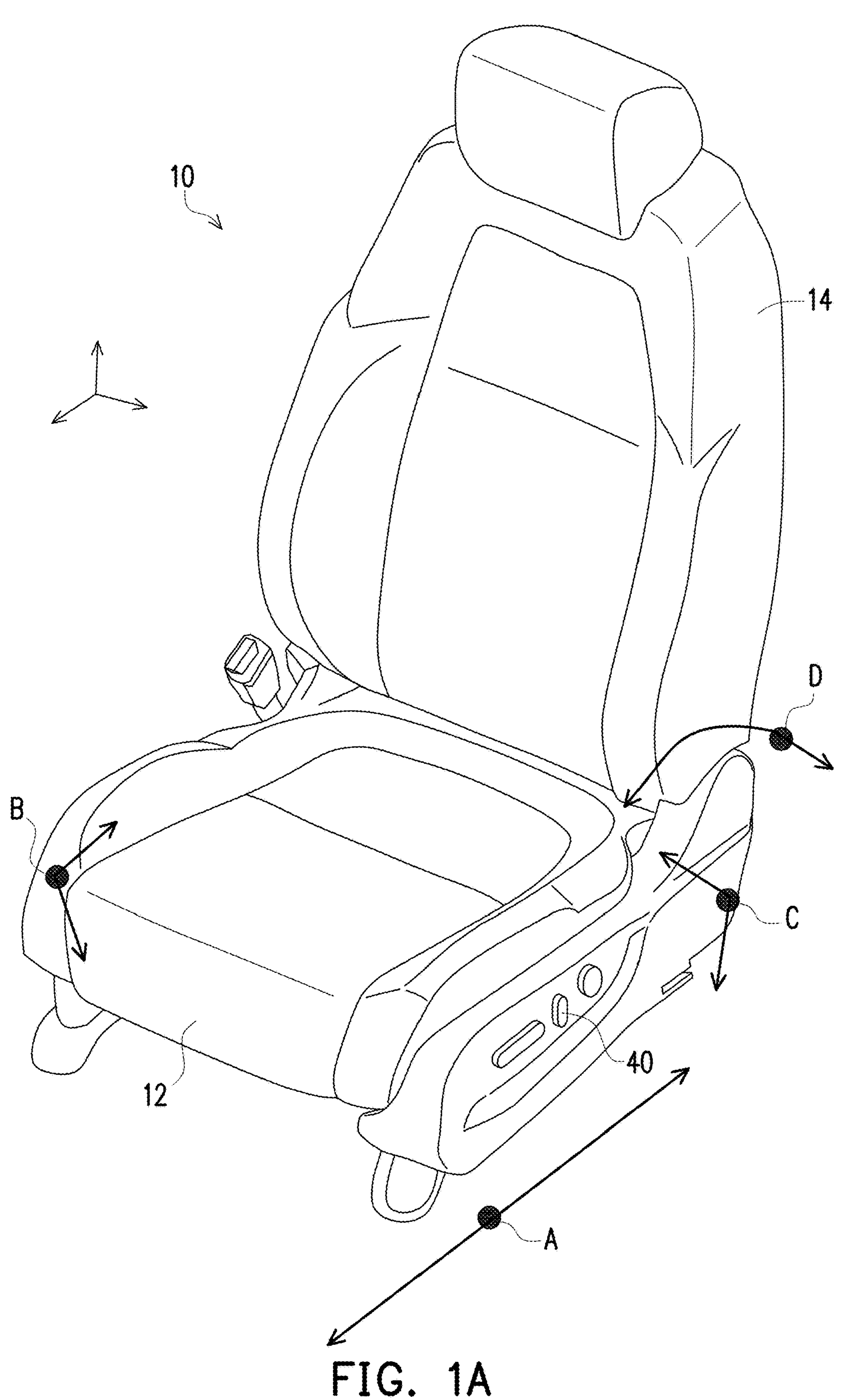
FIG. 1A and FIG. 1B are schematic structural diagrams of a seat of a vehicle.

According to an embodiment of the disclosure, in the seat device for the vehicle and the control method thereof, the reverse movement amount is equal to a movement amount of the seat during a time from when the load change starts to when the pinch detection unit detects that the obstacle is pinched.

According to an embodiment of the disclosure, in the seat device for the vehicle and the control method thereof, the vehicle further includes a power sliding door, and when the pinch detection unit detects that the obstacle is pinched, the control unit or the control method further causes the power sliding door to open.

According to an embodiment of the disclosure, in the seat device for the vehicle and the control method thereof, when the pinch detection unit detects that the obstacle is pinched, the control unit or the control method further causes other seats in the same row as the seat to automatically move forward.

According to an embodiment of the disclosure, in the seat device for the vehicle and the control method thereof, when a seat located behind the seat is an automatic seat and the pinch detection unit detects that the obstacle is pinched, the control unit or the control method further causes a rear automatic seat to automatically move backward.

According to an embodiment of the disclosure, in the seat device for the vehicle and the control method thereof, when the pinch detection unit detects that the obstacle is pinched, the control unit or the control method further causes interior lights of the vehicle to turn on.

According to an embodiment of the disclosure, in the seat device for the vehicle and the control method thereof, the seat of the vehicle further includes a seat cushion portion and a seat back portion.

Reference will now be made in detail to the present preferred embodiments of the disclosure, examples of which are illustrated in the accompanying drawings. Whenever possible, the same reference numbers are used in the drawings and description to refer to the same or like parts.

Figure 1B:
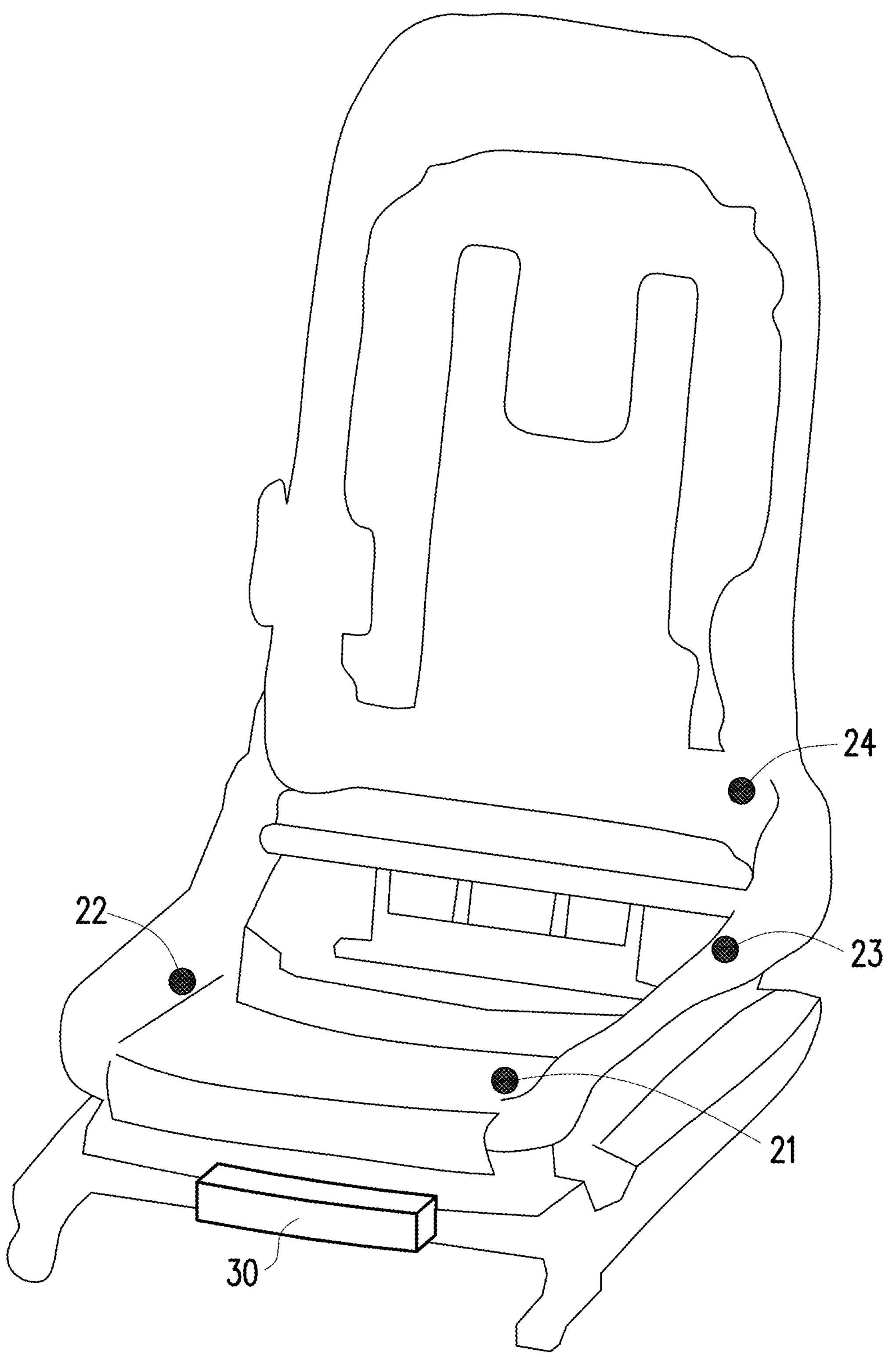

FIG. 1A and FIG. 1B are schematic structural diagrams of a seat of a vehicle. As shown in FIG. 1A and FIG. 1B, as an example, a seat 10 of the vehicle may include a seat cushion portion 12 and a seat back portion 14. Furthermore, the seat cushion portion 12 and the seat back portion 14 may be pivotally connected together. Generally speaking, the seat 10 is disposed in the interior of the vehicle. The seats disposed at the front of the vehicle may include at least a driver seat and a passenger seat. Generally speaking, the seat of the vehicle may provide movement or rotation in at least four directions, such as forward and backward movement of the entire seat 10, up and down movement of the entire seat 10, tilt movement of the front end of the seat cushion portion 12, and forward and backward tilt movement of the seat back portion 14. Of course, in higher-end seats 10, more directions of movement may be provided.

As shown in FIG. 1A and FIG. 1B, the seat 10 is slidably mounted on the floor of the interior of the vehicle, whereby the seat 10 may move forward and backward along a direction A (substantially in line with the front-rear direction of the vehicle) by a motor 21. The seat 10 may move (tilt) the front end of the seat cushion portion 12 up and down in a direction B by a motor 22. The seat 10 may move up and down in a direction C (i.e., the height direction) by a motor 23, whereby the height of the seat 10 may be adjusted. Thus, the seat back portion 14 may be rotated in a direction D by a motor 24, that is, the seat back portion 14 may fall backward or forward.

As an embodiment, the seat 10 may also be disposed with a controller 30, such as a seat control electric control unit (ECU). The controller 30 is composed of, for example, a processor, which may receive user instructions (for example, the user may operate a switch group 40 disposed on the seat 10) to control at least one of the motors 21 to 24 to adjust the posture of the seat 10. The controller 30 as the seat control ECU is also used to execute the control programs described later. In addition, these control programs may also be controlled by the vehicle's core ECU. The core ECU may receive detection signals from various sensors disposed in a vehicle V, and perform corresponding control programs through calculations.

Figure 2:
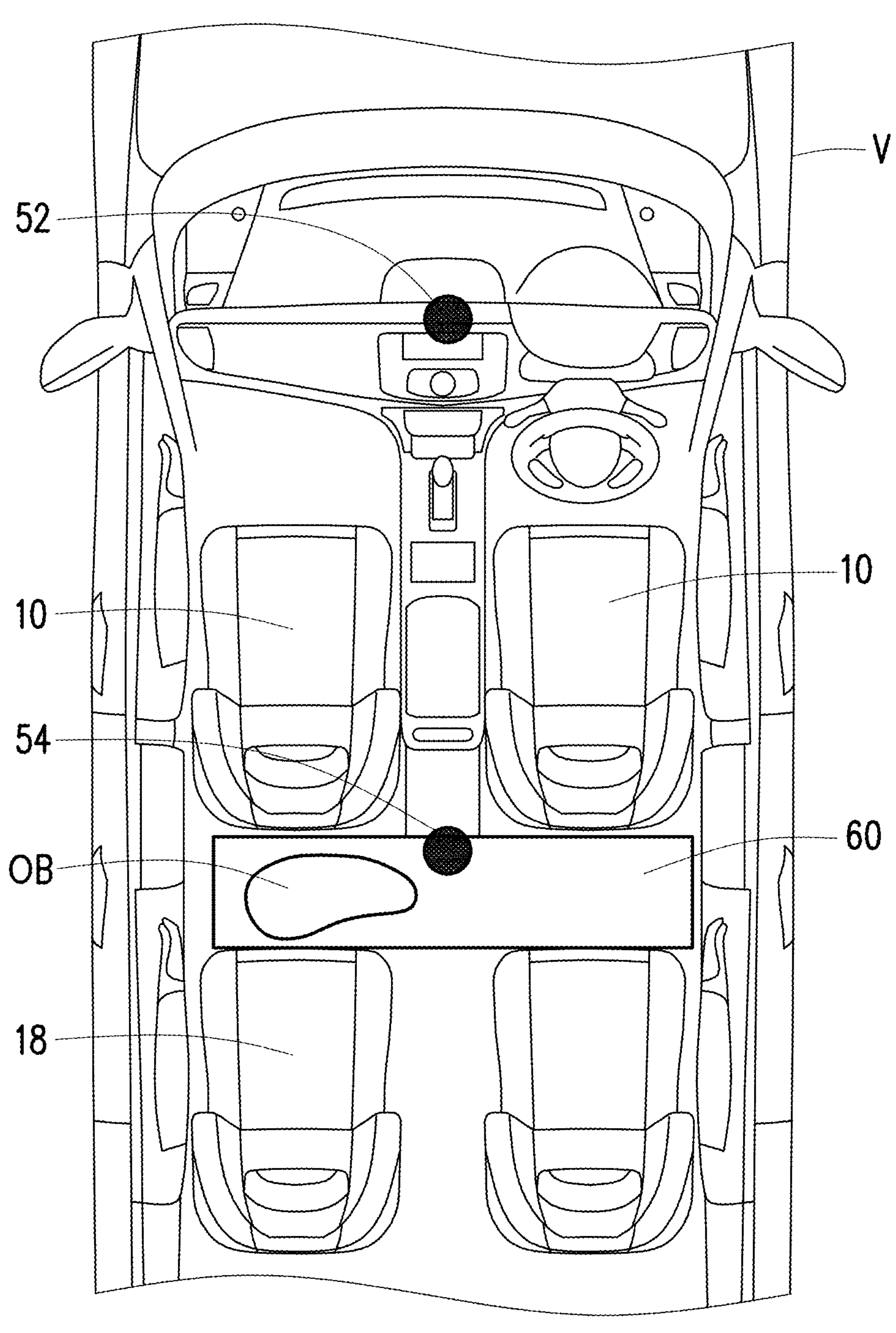
FIG. 2 is a schematic structural diagram of detecting an obstacle inside a vehicle.

FIG. 2 is a schematic structural diagram of detecting an obstacle inside a vehicle. As shown in FIG. 2, detection devices 52 and 54 for detecting an obstacle OB are disposed in the interior of the vehicle V. These detection devices 52 and 54 may be, for example, cameras or radars. As an example, a camera or a radar, etc., may be disposed in the roof pad of the vehicle V, and of course may also be disposed in other suitable places in the interior of the vehicle V. As an example of an embodiment of the disclosure, the cameras or radars 52 and 54 may detect within a detection area 60 between the front seat 10 and a rear seat 18 to determine whether the obstacle OB exists within the detection area 60.

Figures 3A, 3B:
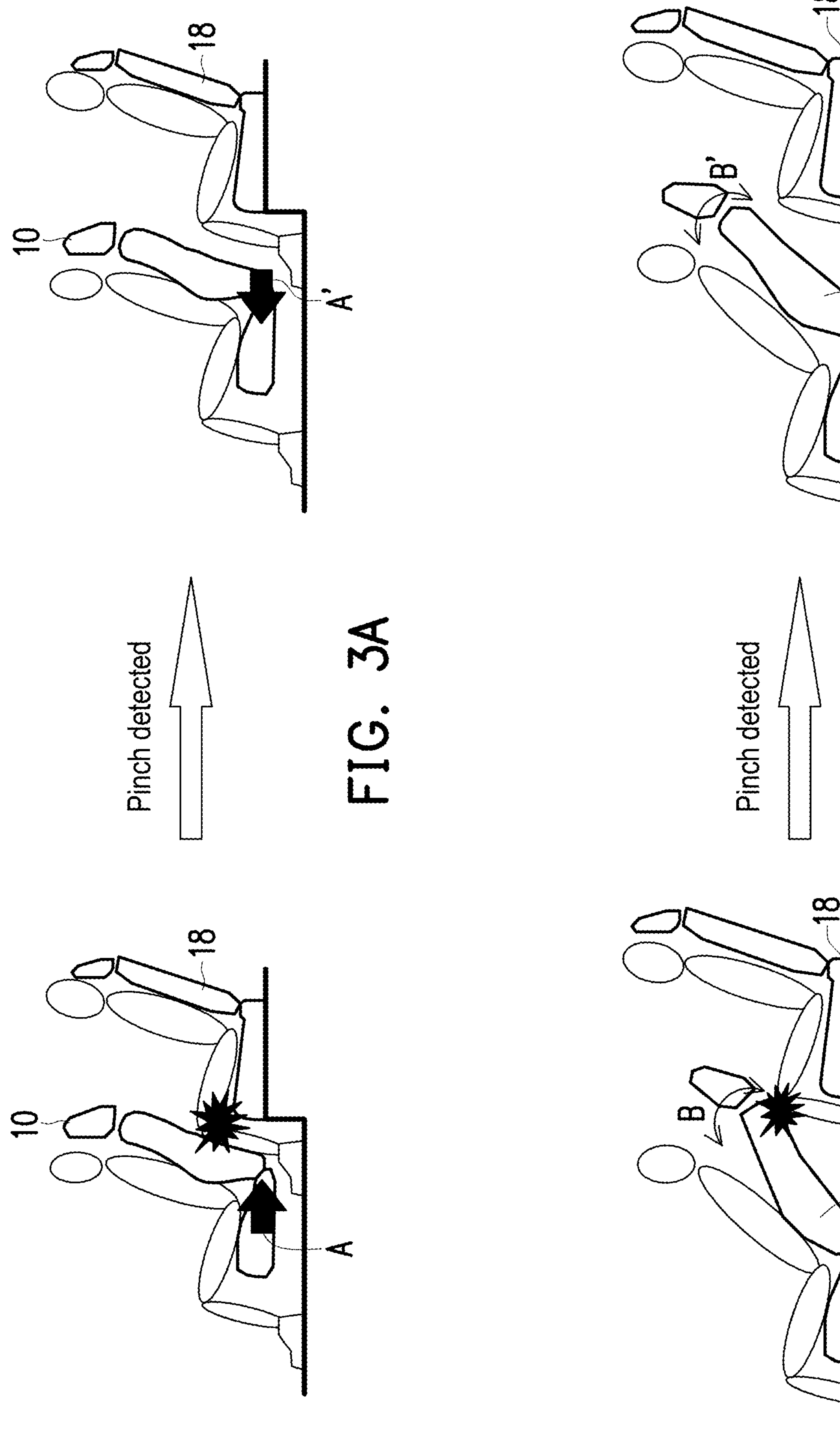
FIG. 3A and FIG. 3B show a pinch condition caused by a seat movement.

FIG. 3A and FIG. 3B show a pinch condition caused by a seat movement. As shown in FIG. 3A, when the front driver or passenger adjusts the seat 10 to move backward along the direction A, the seat 10 may pinch the occupant of the rear seat 18. At this time, the controller 30 serving as the seat control ECU may control the motor 21 of the seat 10 (see FIG. 1B) to move the seat 10 forward a predetermined distance along a direction A' opposite to the direction A, so as to relieve the seat 10 from pinching the occupant of the rear seat 18. Likewise, as shown in FIG. 3B, when the front driver or passenger adjusts the seat 10 along the direction D so that the seat back portion 14 falls backward, the seat 10 may pinch the occupant of the rear seat 18. At this time, the controller 30 serving as the seat control ECU may control the motor 24 of the seat 10 (see FIG. 1B) to make the seat back portion 14 of the seat 10 fall forward a predetermined distance along a direction D' opposite to the direction D, so as to relieve the seat 10 from pinching the occupant of the rear seat 18.

According to the embodiment of the disclosure, the disclosure further provides a control method for the seat 10 when an obstacle exists between the front seat 10 and the rear seat 18, so as to avoid the obstacle OB and the rear occupant from being pinched. This control method is further described below.

Figure 4:
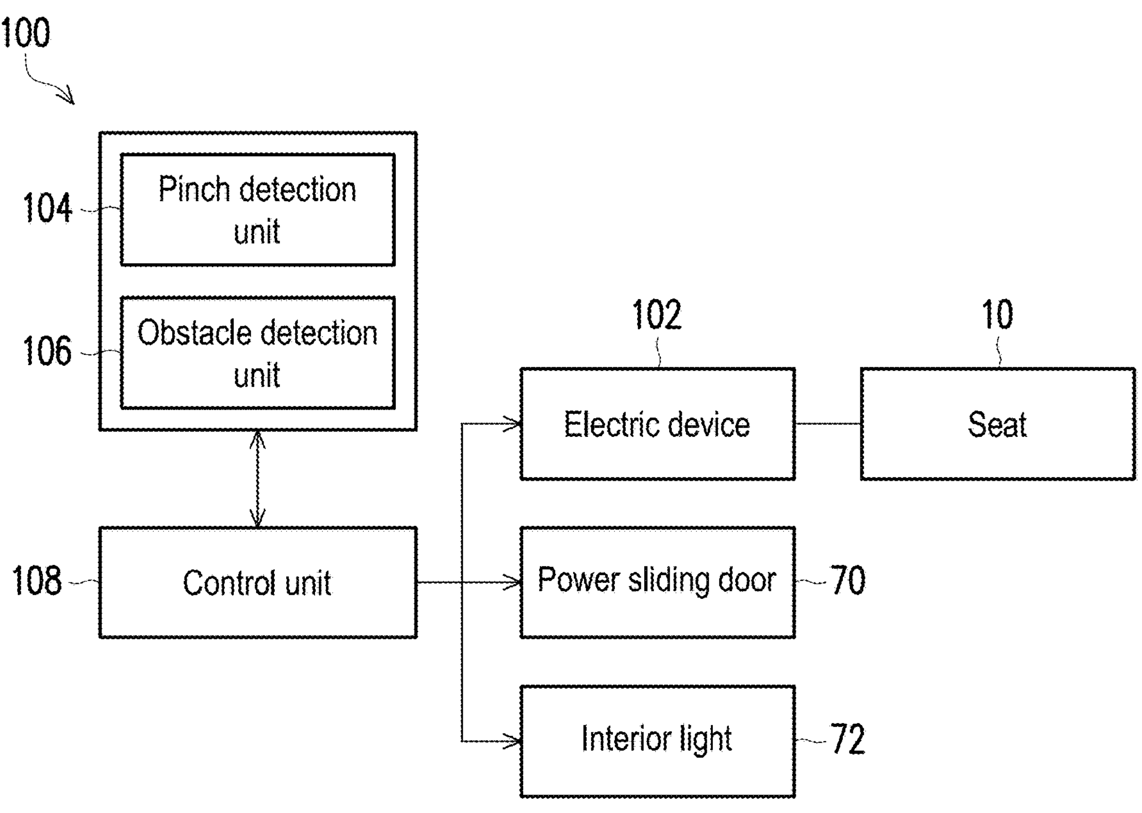
FIG. 4 is a schematic structural diagram of a seat device for a vehicle according to an embodiment of the disclosure.

FIG. 4 is a schematic block diagram of a seat device for a vehicle according to an embodiment of the disclosure. As shown in FIG. 1A and FIG. 1B to FIG. 4, a seat device 100 may include an electric device 102, a pinch detection unit 104, an obstacle detection unit 106, and a control unit 108. The electric device 102 is configured to move the seat 10 of the vehicle V, that is, to control the movement of the seat 10 in the directions A to D shown in FIG. 1A. The electric device 102 may be composed of the motors 21 to 24 shown in FIG. 1B.

Furthermore, the pinch detection unit 104 is configured to detect whether the obstacle OB is pinched by detecting a load change (i.e., a difference in motor speed) of the electric device 102 when the seat 10 moves. The motor speed here may refer to any one or a combination of the motors 21 to 24 mounted on the seat 10. The obstacle OB is usually pinched when the seat 10 moves forward or backward or the seat back portion 14 falls backward. Therefore, for example, the seat control ECU shown in FIG. 1B may be used to detect the speed change of the motors 21 and 24 to determine the change in the pinch load on the obstacle OB.

The obstacle detection unit 106 detects whether the obstacle OB exists in the moving direction of the seat 10. That is, as shown in FIG. 2, the detection devices 52 and 54 such as cameras or radars in the vehicle V may detect whether the obstacle OB exists in the detection area 60.

The control unit 108 may be implemented by the controller 30 of the seat control ECU or may be implemented by the core ECU of the vehicle. Here, the control unit 108 may generate a control signal for controlling the electric device 102 based on the detection results from the pinch detection unit 104 and the obstacle detection unit 106, so as to cause the seat 10 to perform corresponding actions.

Figure 5:
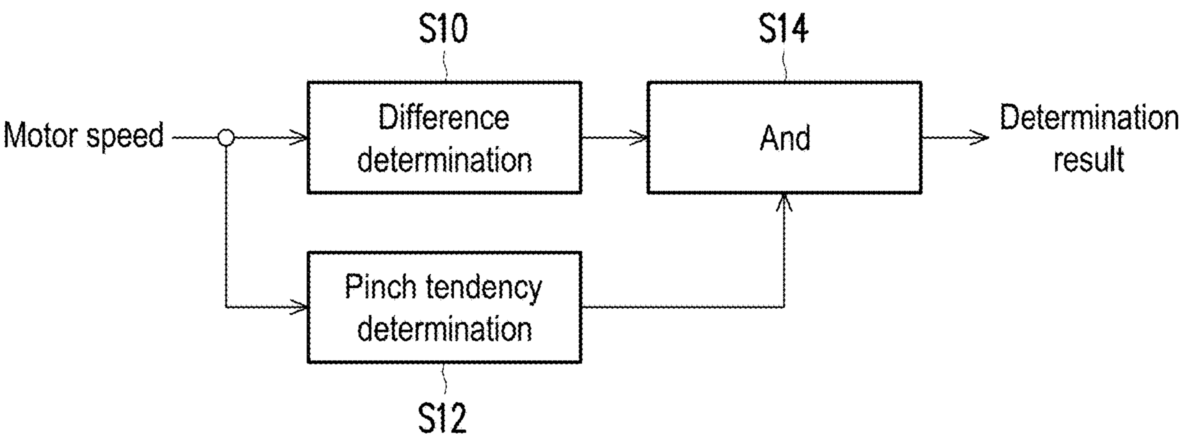
FIG. 5 is a schematic diagram showing a logical concept for determining a pinch according to an embodiment of the disclosure.

FIG. 5 is a schematic diagram showing a logical concept for determining a pinch according to an embodiment of the disclosure. As shown in FIG. 5, after receiving the motor speed (for example, through the controller 30 as the seat control ECU), the control unit 108 performs a difference value determination in step S10 and a pinch tendency determination in step S12. Finally, in step S14, the determination results of steps S10 and S12 are combined to output the determination result of the seat 10 pinching the obstacle 10. That is, when the seat 10 pinches the obstacle OB or the occupant of the rear seat 18, the rotation speed of the motor (such as the motors 21 to 24) will decrease. Afterwards, the difference in speed reduction amount (i.e., equivalent to the differential value) may be calculated. Thereafter, it is determined whether the difference exceeds a predetermined determination threshold, and when the difference value shows a tendency for pinch, it is determined that a pinch has occurred.

Regarding step S10, when performing the difference determination, that is, performing the motor speed difference determination, a difference Δ in motor speed is calculated at a certain count (such as a certain interval). When the difference Δ exceeds a predetermined determination threshold, it is determined that a pinch has occurred.

Figures 6A, 6B, 7A, 7B:
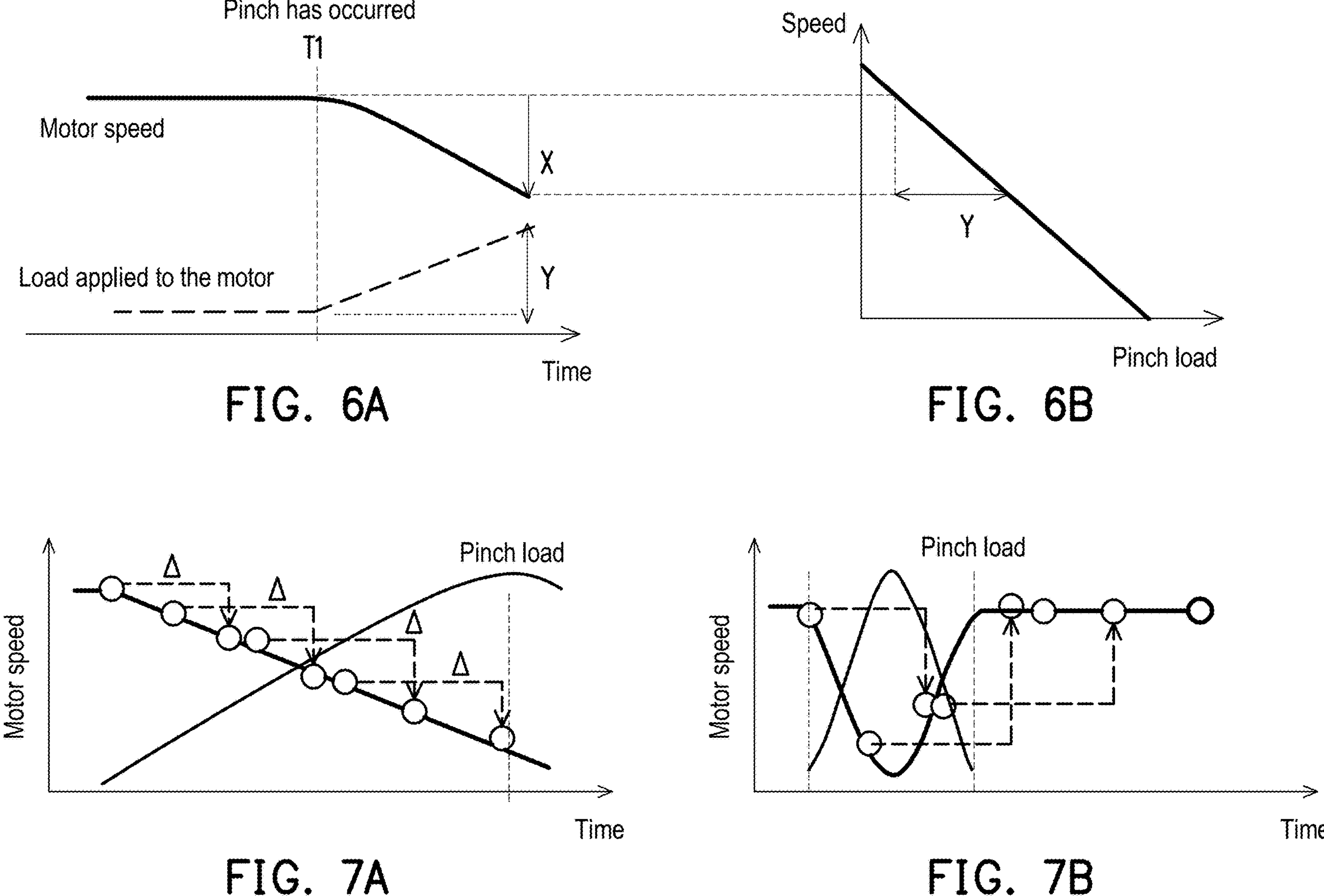
FIG. 6A and FIG. 6B are schematic diagrams showing a relationship between a motor speed and a motor load when a pinch occurs.
FIG. 7A and FIG. 7B show changes in motor speed in the absence and presence of external force.

As shown in FIG. 6A and FIG. 6B, when the pinch occurs at time T1, the motor speed begins to decrease with the increase of time, where X is the reduction amount of the motor speed caused by the pinch. At the same time, the load (estimated value) applied to the motor also begins to increase with the increase of time, where Y is the increase in the load on the obstacle caused by the pinch. Therefore, by using the characteristic curve of the motor, the pinch load on the obstacle OB may be estimated from the amount of change in the motor speed.

In addition, if the motor speed difference determination is used alone to determine whether a pinch has occurred, the motor speed may change drastically due to local interference from external forces (such as if an occupant suddenly sits up), which in turn leads to an erroneous determination. Therefore, the disclosure further performs the pinch tendency determination through step S12. Firstly, the difference in the motor speed calculated each time is compared for a period of time, and if the difference maintains a substantially fixed value, it may be determined that a pinch has occurred.

As shown in FIG. 7A, the difference A between the motor speeds calculated per time period is substantially kept constant, and the increase in the pinch load when pinch occurs will take a relatively long time to change. As shown in FIG. 7B, the pinch load caused by the external force disturbance changes greatly in a short period of time. Therefore, the measurement data from past measurements may be used to analyze whether there is a tendency for pinch.

Figure 8A:
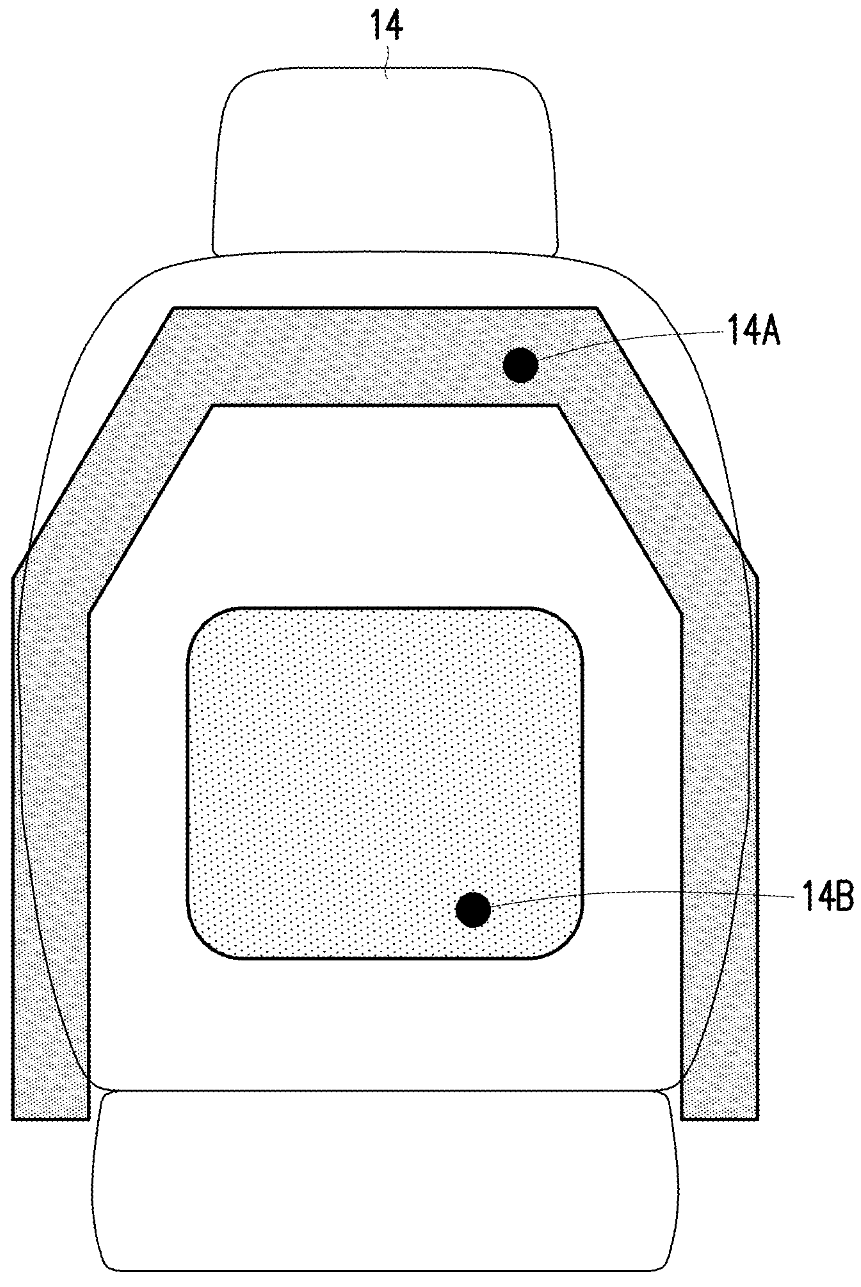
FIG. 8A and FIG. 8B are explanatory diagrams for explaining a difference in time points when each rigid portion of the seat is pinched.
Figure 8B:
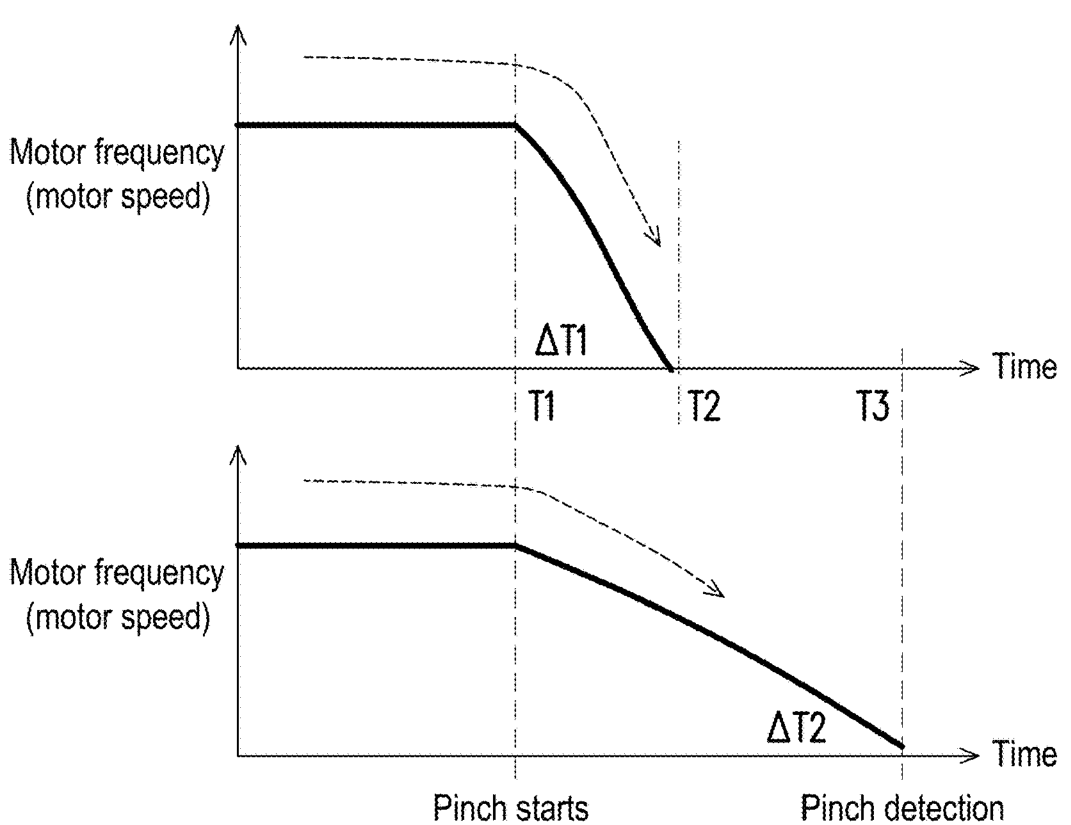

FIG. 8A and FIG. 8B are explanatory diagrams for explaining a difference in time points when each rigid portion of the seat is pinched. As shown in FIG. 8A, a schematic diagram of the seat back portion 14 of the seat 10 is shown. Since the material of the seat 10 is soft and the rigidity of each portion may be different, the pinch load caused by each portion will be different. As an illustrative example, the seat back portion 14 may have a higher rigidity portion 14A as a framed portion and a lower rigidity portion 14B that is hollow inside. When the pinch detection unit 104 determines the time point of whether the pinch occurs, the time point when the pinch occurs in the two portions 14A and 14B of the seat back portion 14 will be different.

As shown in the upper half of FIG. 8B, since the portion 14A of the seat back portion 14 has higher rigidity, the pinch load obtained through the difference analysis of motor speeds is larger. Therefore, the time from the time point T1 when the pinch starts to the time point T2 when the pinch is determined to have occurred will be faster (elapsed time ΔT1=T2−T1), that is, the motor speed will decrease faster. On the contrary, as shown in the lower half of FIG. 8B, since the portion 14B of the seat back portion 14 has lower rigidity, the pinch load obtained through the difference analysis of motor speeds is smaller. Therefore, the time from the time point T1 when the pinch starts to the time point T3 when the pinch is determined to occur will be slower (elapsed time ΔT2=T3−T1), that is, the motor speed decreases slowly.

It can be seen from FIG. 8B that when the pinch points are different, the time point at which the pinch detection unit 104 determines that pinch occurs is also different. At this time, the movement amount of the seat 10 is also different. That is to say, when the portion 14A with higher rigidity is pinched, the movement amount of the seat 10 is smaller, and when the portion 14B with lower rigidity is pinched, the movement amount of the seat 10 is larger. Therefore, if the seat 10 is reversely moved by the same reverse movement amount when the pinch occurs, the avoidance spaces will be different.

Figure 9:
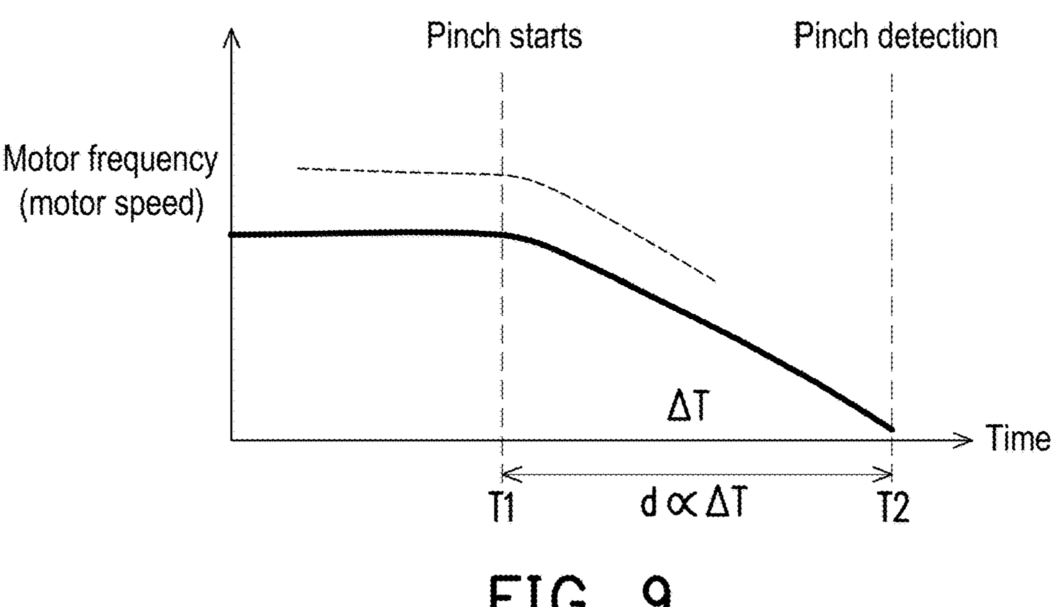
FIG. 9 is a conceptual diagram showing a method for determining a reverse movement amount according to an embodiment of the disclosure.

FIG. 9 is a conceptual diagram showing a method for determining a reverse movement amount according to an embodiment of the disclosure. As shown in FIG. 9, according to the embodiment of the disclosure, when the pinch detection unit 104 detects that the obstacle OB is pinched, the electric device 102 is caused to perform a reverse operation, thereby causing the seat 10 to reversely move. At this time, the reverse movement of the seat 10 does not cause the seat 10 to reversely move with a fixed reverse movement amount. Instead, a reverse movement amount d by which the seat 10 is reversely moved is determined based on the time from the time point T1 when the load change (motor speed) starts to the time T2 when the pinch detection unit 104 detects that the obstacle OB is pinched.

According to the embodiment of the disclosure, the reverse movement amount d of the seat 10 may be basically set to be proportional to, such as directly proportional to, the elapsed time ΔT from the start of pinch T1 to the detection of pinch T2. According to the embodiment of the disclosure, the reverse movement amount d may be equal to the movement amount of the seat during the time from when the load change starts (pinch start) to when the pinch detection unit 104 detects that the obstacle OB is pinched (pinch detection).

Furthermore, according to the embodiment of the disclosure, in order to increase the avoidance space, in addition to the reverse movement of the seat 10, other equipment of the vehicle may also be coordinated to move. For example, when it is detected that the pinch occurs, in addition to the seat 10 that caused the pinch, another seat (i.e., the front seat in the same row) may also be moved forward as a whole and the seat back portion of the seat may be tilted forward. For example, if there is a pinch with the seat 10 of the driver and a rear occupant or an obstacle, the seat 10 of the passenger as a whole is also automatically moved forward and the seat back portion of the seat is tilted forward. In this way, the occupant of the rear seat 18 may obtain greater avoidance space. In addition, if the vehicle V is equipped with a power sliding door 70, the power sliding door may also be automatically opened at the same time. In this way, the avoidance space may include the outside of the vehicle V, and the occupant of the rear seat 18 may obtain a larger avoidance space.

Also, with the popularity of autonomous driving, it is expected that second-row electric seats will become standard seating configuration. As an example, if there is a pinch with the front seat 10 and the occupant of the rear seat 18 of the second row (or the obstacle OB between the seats), when the pinch detection unit 104 detects the occurrence of pinch, in addition to the reverse movement of the front seat 10, the rear seat 18 of the second row is also automatically moved backward and/or the seat back portion is tilted, and the electric footrest, etc., is automatically stowed away so as to increase the avoidance space.

Also, if the pinch occurs at night and the interior of vehicle V is dark, after the pinch detection unit 104 detects the occurrence of pinch, the control unit 180 may also automatically turn on the interior light 72 closest to the position where the pinch occurs, so that the occupants may see the avoidance space more clearly to avoid danger.

Figure 10:
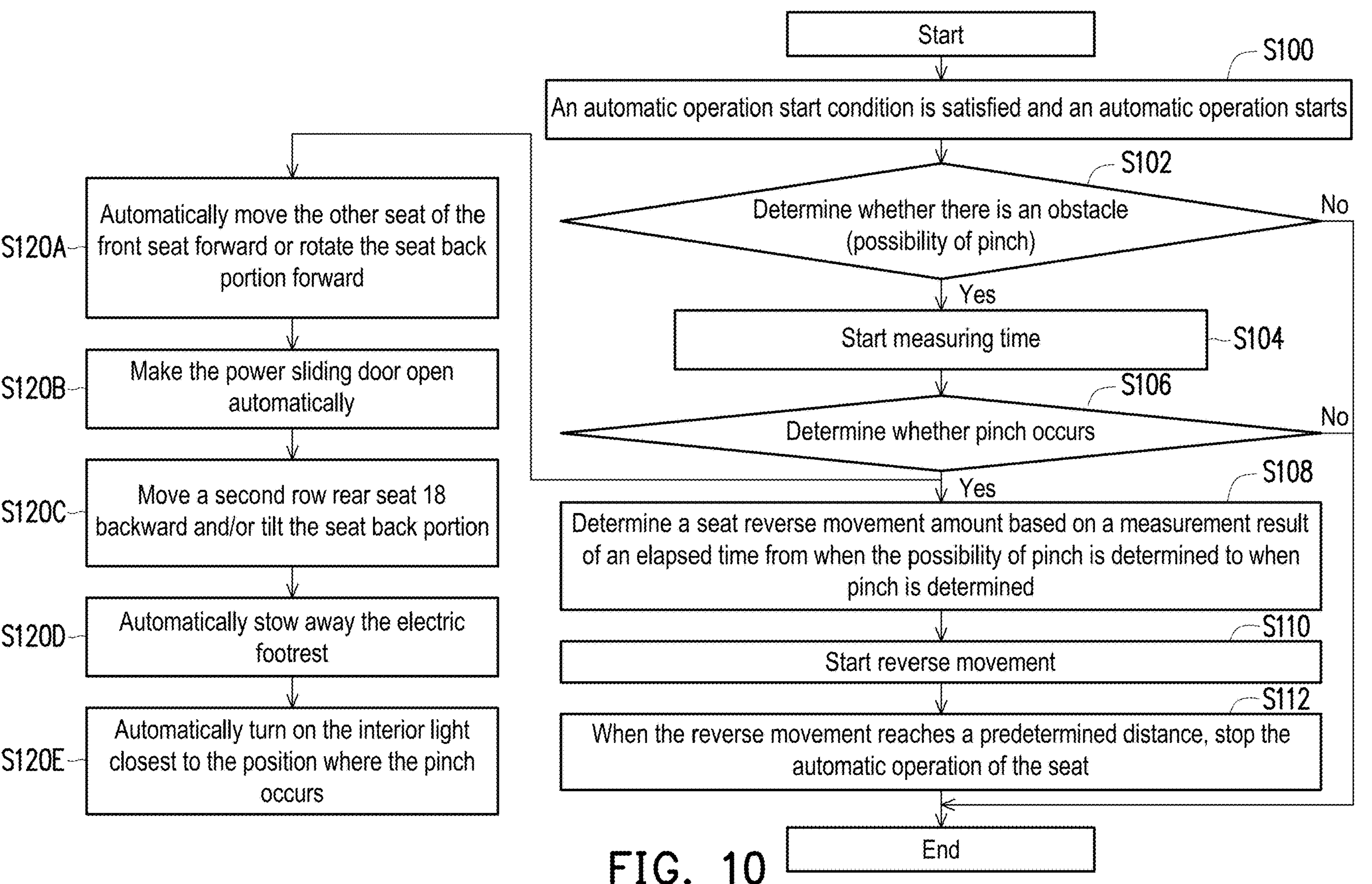
FIG. 10 is a schematic flowchart of a control flow of a vehicle seat according to an embodiment of the disclosure.

FIG. 10 is a schematic flowchart of a control flow of a vehicle seat according to an embodiment of the disclosure. As shown in FIG. 10, in step S100, the automatic operation start condition is satisfied, and the automatic operation starts. The automatic operation here may refer to the automatic adjustment operation of the seat 10 of the vehicle V, which is an automatic movement in at least four directions A to D as shown in FIG. 1A.

In step S102, the possibility of pinch is determined. For example, the above-mentioned pinch detection unit 104 detects whether there is a pinch with the occupant of the rear seat 18 or the obstacle OB between the seats (detected by the above-mentioned obstacle detection unit 106). At this time, determining the possibility of pinch refers to determining the time point when pinch starts, for example, the time point when the motor speed of the seat 10 starts to decrease. When step S102 determines that there is a possibility of pinch, step S104 is executed. On the contrary, when step S102 determines that there is no possibility of pinch, the control flow ends.

In step S104, start timing. At this time, for example, a timer may be used to start calculating the elapsed time at a time point when the motor speed starts to decrease (time point T1 shown in FIG. 9).

In step S106, it is determined whether pinch is detected. After starting to calculate the elapsed time in step S104, the control unit 108 may determine whether the difference in motor speed exceeds a determination threshold. When the difference in motor speed exceeds the determination threshold and it is determined that pinch is detected, step S108 is executed. On the contrary, when step S106 determines that pinch is not detected, that is, the difference in motor speed does not exceed the determination threshold, the control flow ends.

Next, in step S108, the reverse movement amount d of the seat 10 is determined based on the measurement result of the elapsed time from when the possibility of pinch is determined in step S102 to when pinch is determined in step S106. That is, as shown in FIG. 9, the elapsed time ΔT is measured in the section between the time point T1 when pinch starts and the time point T2 when pinch is detected. Then, the reverse movement amount d is calculated based on this elapsed time ΔT.

Next, in step S110, the reverse movement is started. That is, when pinch is detected (time point T2 in FIG. 9), the seat 10 starts to reversely move based on the reverse movement amount d calculated in step S108.

In step S112, after the control unit 108 causes the seat 10 to start to reversely move, and after the seat 10 has reversely moved by the reverse movement amount d, the automatic operation of the seat 10 is stopped, and the control flow ends.

As an optional action, according to the embodiment of the disclosure, when it is determined that pinch is detected in step S106, in addition to executing the control steps of steps S108 to S112, the operations of steps S120A to A120E may also be executed.

For example, in step S120A, after the pinch detection unit 104 detects the occurrence of pinch, the control unit 108 may also cause the other seat of the front seat to automatically move forward or rotate the seat back portion forward to increase the avoidance space for the rear occupant. For example, when the seat 10 of the driver is pinched, the passenger seat is further moved forward.

For example, in step 120B, for the vehicle V equipped with the power sliding door 70, after the pinch detection unit 104 detects the occurrence of pinch, the control unit 108 may also automatically open the power sliding door at the same time to increase the avoidance space of the occupant.

For example, in step S120C, for a vehicle equipped with second-row electric seats, after the pinch detection unit 104 detects the occurrence of pinch, the control unit 108 may also automatically move the rear seats 18 of the second row backward and/or tilt the seat back portion to increase the avoidance space.

For example, in step S120D, for a vehicle equipped with an electric footrest, etc., the electric footrest or the like may be automatically stowed away to increase the avoidance space.

For example, in step S120E, at night, after the pinch detection unit 104 detects the occurrence of pinch, the control unit 180 may also automatically turn on the interior light 72 closest to the position where the pinch occurs, so as to make the avoidance space easily identifiable to avoid danger.

In addition, the auxiliary operations of the above-mentioned steps S120A to S120E are optional. In addition, the auxiliary operations of steps S120A to S120E are only examples. If there are other ways to increase the avoidance space, they may be applied to the implementation of the disclosure. In addition, the above-mentioned auxiliary operations of steps S120A to S120E may be implemented simultaneously or separately. In addition, the above-mentioned auxiliary operations of steps S120A to S120E may be all implemented, or only one or a few of them may be implemented.

According to the embodiment of the disclosure, by making the reverse movement amount variable, the stopping position of the seat after the reverse operation does not change and may be kept fixed, thereby ensuring an avoidance space. Also, when a pinch is detected, the other seat (if the driver seat is detected, the other seat is the passenger seat) as well as the power sliding door and the second seat also operate at the same time, thereby further ensuring the surrounding avoidance space. Also, considering the nighttime environment, when a pinch is detected, the interior lights in the vehicle may also be turned on to create an environment where it is easier to avoid obstacles.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments can still be modified, or parts or all of the technical features thereof can be equivalently replaced; however, these modifications or substitutions do not deviate the essence of the corresponding technical solutions from the scope of the technical solutions of the embodiments of the disclosure.

What is claimed is:

1. A seat device for a vehicle, comprising:

one or more motors, configured to move a seat of the vehicle; and a hardware processor configured to:

detect a pinched obstacle by detecting a load change of the one or more motors when the seat moves; and cause the one or more motors to perform a reverse operation when detecting that the obstacle is pinched, so as to cause the seat to reversely move, wherein a reverse movement amount by which the seat is reversely moved is determined based on a time from when the load change starts to when detecting that the obstacle is pinched, wherein the reverse movement amount is equal to a movement amount of the seat during a time from when the load change starts to when detecting that the obstacle is pinched.

2. The seat device for the vehicle according to claim 1, wherein the vehicle further comprises a power sliding door, and when detecting that the obstacle is pinched, the hardware processor further causes the power sliding door to open.

3. The seat device for the vehicle according to claim 1, wherein when detecting that the obstacle is pinched, the hardware processor further causes other seats in a same row as the seat to automatically move forward, wherein the other seats are capable of automatically moving forward and are not at a forward-most position.

4. The seat device for the vehicle according to claim 1, wherein when a rear seat behind the seat is an automatic seat, and when detecting that the obstacle is pinched, the hardware processor further causes the rear automatic seat to automatically move backward.

5. The seat device for the vehicle according to claim 1, wherein when detecting that the obstacle is pinched, the hardware processor further turns on an interior light of the vehicle.

6. The seat device for the vehicle according to claim 1, wherein the seat of the vehicle further comprises a seat cushion portion and a seat back portion.

7. A control method for a seat device for a vehicle, wherein the seat device has one or more motors configured to move a seat of the vehicle, and the control method comprises:

detecting a pinched obstacle by detecting a load change of the one or more motors when the seat moves; and causing the one or more motors to perform a reverse operation when it is detected that the obstacle is pinched, so as to cause the seat to reversely move, wherein a reverse movement amount by which the seat is reversely moved is determined based on a time from when the load change starts to when the pinch detection unit detects that the obstacle is pinched, wherein the reverse movement amount is equal to a movement amount of the seat during a time from when the load change starts to when the obstacle is detected to be pinched.

8. The control method for the seat device for the vehicle according to claim 7, wherein the vehicle is further equipped with a power sliding door, and the control method further comprises: further opening the power sliding door when the obstacle is detected to be pinched.

9. The control method for the seat device for the vehicle according to claim 7, wherein the control method further comprises: further causing other seats in a same row as the seat to automatically move forward when the obstacle is detected to be pinched, wherein the other seats are capable of automatically moving forward and are not at a forward-most position.

10. The control method for the seat device for the vehicle according to claim 7, wherein when a rear seat behind the seat is an automatic seat, the control method further comprises: further causing the rear automatic seat to automatically move backward when the obstacle is detected to be pinched.

11. The control method for the seat device for the vehicle according to claim 7, wherein the control method further comprises: further turning on an interior light of the vehicle when the obstacle is detected to be pinched.

12. The control method of a seat device for the vehicle according to claim 7, wherein the seat of the vehicle further comprises a seat cushion portion and a seat back portion.

* * * * *